United States Patent [19]

Nishi et al.

[11] Patent Number: 4,959,281
[45] Date of Patent: Sep. 25, 1990

[54] NON AQUEOUS ELECTROLYTE CELL

[75] Inventors: Yoshio Nishi; Hideto Azuma; Atsuo Omaru, all of Kanagawa, Japan

[73] Assignee: Sony Corporation, Tokyo, Japan

[21] Appl. No.: 399,982

[22] Filed: Aug. 29, 1989

[30] Foreign Application Priority Data

Aug. 30, 1988 [JP]  Japan .................. 63-217295

[51] Int. Cl.$^5$ .................. H01M 4/38; H01M 10/40
[52] U.S. Cl. .................. 429/194; 429/218; 423/445
[58] Field of Search ............. 204/242, 294; 429/194, 429/218; 423/445

[56] References Cited

U.S. PATENT DOCUMENTS

| | | | |
|---|---|---|---|
| 4,615,959 | 10/1986 | Hayashi et al. | 429/194 |
| 4,668,595 | 5/1987 | Yoshino et al. | 429/218 X |
| 4,702,977 | 10/1987 | Hiratsuka et al. | 429/194 |
| 4,725,422 | 2/1988 | Miyabayashi et al. | 423/445 |
| 4,835,075 | 5/1989 | Tajima et al. | 423/445 |
| 4,863,814 | 9/1989 | Mohri et al. | 423/445 X |

OTHER PUBLICATIONS

Patent Abstracts of Japan for Japanese Patent No. 61-163562, vol. 10, No. 367 (E-462) [2424] Dec. 9, 1986.

Primary Examiner—Donald R. Valentine
Attorney, Agent, or Firm—Hill, Van Santen, Steadman & Simpson

[57] ABSTRACT

An improved non-aqueous electrolyte cell is disclosed in which specific carbonaceous material is used as an anode. The carbonaceous material has interlayer spacing $d_{002}$ of not less than 3.70 A, true density not larger than 1.70 g/cm$^3$ and no exothermic peak not less than 700° C. upon differential thermal analysis under air stream. The combination with cathode active material containing Li in an amount not less than 250 mAH/g in term of charging/discharging capacity, provides superior cyclic life characterisitcs and large capacity.

3 Claims, 4 Drawing Sheets

NON AQUEOUS ELECTROLYTE CELL

BACKGROUND OF THE INVENTION

This invention relates to a non-aqueous electrolyte cell and, more particularly, to an improvement in an anode thereof.

A demand is raised for a cell of a higher energy density of keeping with miniaturization of electronic equipment. For meeting this demand, a variety of non-aqueous electrolyte cell, such as so-called lithium cell, have been proposed.

However, the cell making use of lithium metal in the anode, especially when used as a secondary battery, has the disadvantages that (i) 5 to 10 hours are usually required for charging, and the quick charging of the cell is rather difficult and (ii) cyclic service life is short.

These are caused by the lithium metal itself and the main causes are said to be the changes in the lithium form, formation of dendritic lithium and irreversible changes of lithium, brought about by repeated charging and discharging.

As one of the means for overcoming these deficiencies, it has been proposed to use the carbonaceous material in the anode. This takes advantage of the fact that the compound of the intercarbon layer of lithium may be formed easily electro-chemically. For example, when charging is performed in the non-aqueous electrolyte solution, with the carbon as the anode, lithium in the cathode is electro-chemically doped between the carbon layers of the anode. Lithium-doped carbon acts as the lithium electrode and lithium is undoped from between the carbon layers with progress of discharging to return to the cathodes.

Meanwhile, since the current capacity (mAH/g) per unit weight of carbon is determined by the amount of doped lithium at this time, it is desirable that the doped amount of lithium be as large as possible at the anode (theoretically, the upper limit is one Li atom per six carbon atoms).

Heretofore, the carbonaceous material of the anode having the interplanar distance of the (002) plane of the order of 3.40 to 3.60 A and the density of the order of 1.70 to 2.20 g/cm$^3$ is used, as disclosed for example in U.S. Pat. Nos. 4,702,977 and 4,668,595.

However, with such carbonaceous material, the amount of doped lithium is insufficient and of the order of only about half the theoretical amount.

OBJECT AND SUMMARY OF THE INVENTION

Accordingly, it is an object of the present invention to provide an improved non-aqueous electrolyte cell.

It is another object of the present invention to provide a non-aqueous electrolyte cell improved in charging and discharging cyclic characteristics.

It is further object of the present invention to provide a non aqueous electrolyte cell having a large discharge capacity.

According to one aspect of the present invention there is provided a non-aqueous electrolyte cell which comprises anode of a carbonaceous material having an interlayer spacing $d_{002}$ of not less than 3.70 A, true density of less than 1.70 g/cm$^3$, and not having exothermic peak at not less than 700° C. as measured by a differential thermal analysis in air stream, charging/discharging capacity of not less than 250 mAH per 1 gram of the carbonaceous material a non-aqueous electrolyte.

DESCRIPTION OF THE PREFERRED EMBODIMENT

Figure 1:
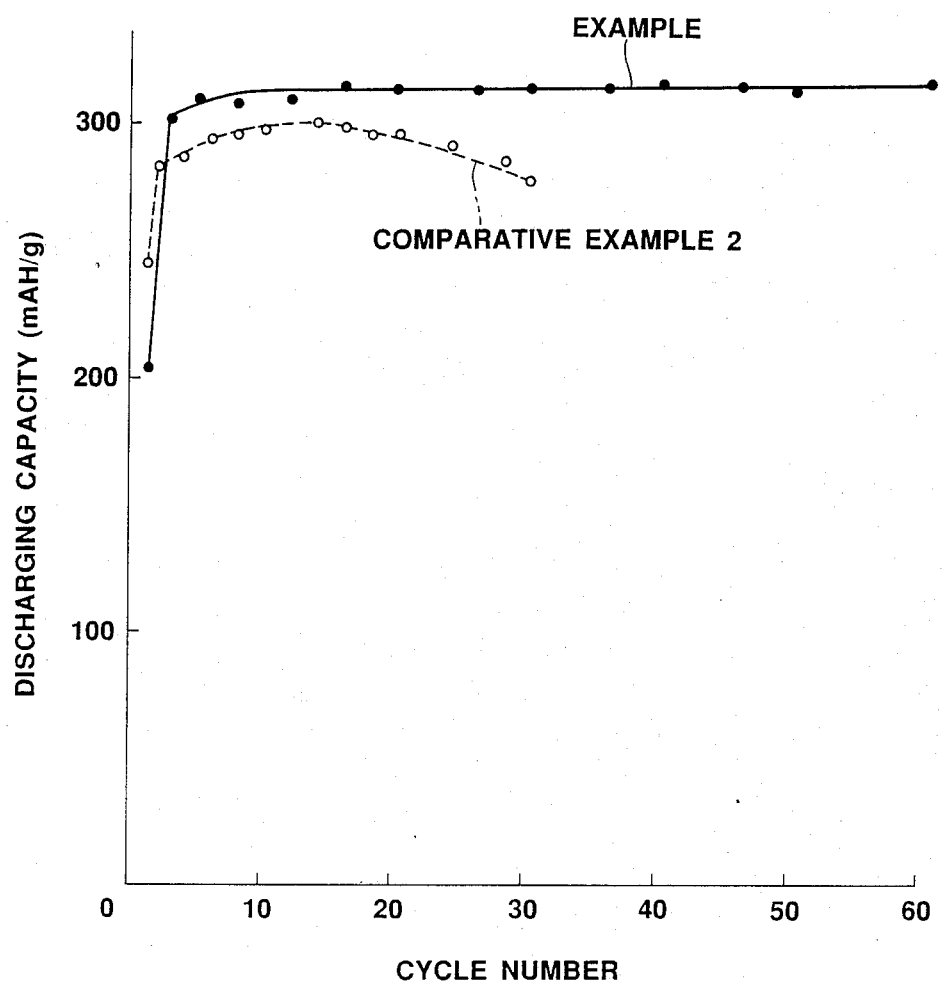
FIG. 1 is a diagram showing the cyclic life characteristics of the cell of the illustrative example of the present invention as compared with those of the comparative example.

The present invention resides in a non-aqueous electrolyte cell comprising an anode of a carbonaceous material having an interlayer spacing $d_{002}$ of not less than 3.70 A, true density of less than 1.70 g/cm$^3$ and not having peak at not less than 700° C. as measured by a differential thermal analysis measured in air stream, a cathode containing Li in an amount corresponding to the charging/discharging capacity of not less than 250 mAH per 1 gram of the carbonaceous material and a non-aqueous electrolyte.

With the interlayer spacing $d_{002}$ (spacing of (002) planes) of the carbonaceous material employed in the anode of less than 3.70 A, the discharge capacity is lowered and the cyclic service life is lowered to the same order as the conventional cell.

Similarly, in excess of 1.70 g/cm$^3$ of true density, the discharge capacity as well as the cyclic service life is deteriorated.

After our various experiments, it has been shown that characteristics of the carbonaceous material represented by the results of the differential thermal analyses affect cell characteristics significantly and that it is necessary not to have the exothermic peak at not lower than 700° C.

The carbonaceous material having such properties may be typified by furan resin carbonized by calcining.

The starting furan resin consists of furfuryl alcohol or a homo-polymer or copolymer of furfural and may be exemplified by a polymer of furfural-phenol, furfuryl alcohol-dimenthylol urea, furfuryl alcohol, furfuryl alcohol-formaldehyde, or furfural-ketone.

On the other hand, it is necessary for the cathode to contain a sufficient amount of Li. With the amount of Li less than 250 mAH/g in terms of the charging/discharging capacity, it is difficult to procure a higher capacity.

Therefore, as the cathode material, a composite metal oxide represented by the general formula $LiMO_2$, wherein M stands for at least one of Co and Ni, or a Li-containing interlayer compound, is preferred. Above all, satisfactory properties may be displayed with use of $LiCoO_2$ Li ion is subtracted from $LiCoO_2$ upon charging the cell to change into $Li_xCoO_2$ where X is smeller than 1.

The non-aqueous electrolyte solution is prepared by suitably combining an organic solvent and an electrolyte. Any of these organic solvents and electrolytes utilized in this type of the cell may be employed.

The organic solvents may be enumerated by propylene carbonate, ethylene carbonate, 1,2-dimethoxyethane, 1,2-diethoxyethane, $\gamma$-butyrolactone, tetrahydrofuran, 2-methyltetrahydrofuran, 1,3-dioxolan, 4-methyl- 1,3-dioxolan, diethyl ether, sulfolan, methyl sulfolan, acetonitrile, propionitrile or anisole.

The electrolytes may be enumerated by $LiClO_4$, $LiAsF_6$, $LiPF_6$, $LiBF_4$, $LiB(C_6H_5)_4$, LiCl, LiBr, $Ch_3SO_3Li$ and $CF_3SO_3Li$.

The interlayer spacing $d_{002}$ of lithium-doped carbon is known to amount to 3.70 A. Therefore, when $d_{002}$ is 3.40 to 3.60 A, as in the conventional carbonaceous material, the interlayer spacing is thought to be enlarged when it is doped with lithium. That is, in the carbonaceous material of $d_{002} < 3.70$ A, lithium doping is thought to become difficult by an amount corresponding to the enlargement of the interlayer spacing, which accounts for the reduced doping amount.

The true density $\rho$ is intimately related with the interlayer spacing, such that, with $\rho > 1.70$ g/cm$^3$, it becomes difficult to procure the aforementioned interlayer spacing, which again results in the reduced amount of doping.

On the other hand, the discharge capacity and the charging/discharging cyclic life characteristics are affected by the structure of the carbonaceous material and the carbonaceous material with the result of the differential thermal analysis having no peak at not lower than 700° C. showed good results. However, the details of the structure are not known.

With a cell having carbon as the anode, shorter charging time suffices than in the case of a cell having metal lithium as the anode. This feature is similarly retained in the cell of the present invention.

The present invention will be explained hereinbelow with reference to examples.

EXAMPLE

A mixture of 500 part by weight of furfuryl alcohol, 2.5 parts by weight of 85%-phosphoric acid aqueous solution and 50 parts by weight of water was heated for five hours over a lukewarm water bath to produce a viscous polymer.

Then 1N NaOH was added to the reaction system. After neutralization to pH 5, residual water and unreacted alcohol were removed by vacuum distillation.

After the produced polymer was carbonized in a nitrogen stream at 500° C. for 5 hours, it was further heated to 1100° C. and heat-treated for one hour.

The thus obtained carbon exhibited a turbo-stratic structure. The results of the X-ray analyses revealed that the interlayer spacing $d_{002}$ of the (002) plane amounted to 3.80 A and the true density $\rho$ amounted to 1.55 g/cm$^3$. As the result of the differential thermal analysis of the obtained carbonaceous material in air stream, the exothermic peak appeared at 671° C.

Using this carbon, the following cells were produced.

First, carbon was ground in a mortar and, after classification with a sieve, the particle size of not more than 390 meshes was used. To 90 parts by weight of the classified carbon were added 10 parts by weight of polyvinylidenefluoride as a binder, and the resulting mixture was turned into a paste with the use of dimenthylformamide. After application on a stainless steal net, pressure bonding was performed at a pressure of 4t/cm$^2$. After during, the product was punched to a suitable shape so as to be used as an anode.

On the other hand, the cathode was produced in the following manner. A mixture consisting of 91 part by weight of $LiNi_{0.2}Co_{0.8}O_2$, 6 parts by weight of graphite and 3 parts by weight of a polytetrafluoroethylene resin was introduced into a casting mold and compression molded under a pressure of 2t/cm$^2$ to make a disk-shaped electrode.

Using the thus produced cathodes and anodes and electrolytic solution consisting of a solvent mixture of propylene carbonate/dimethoxyethan with a volumetric ratio of 1:1 and 1 mol/dm$_3$ of $LiClO_4$, a coin-shaped cell was produced and a charging/discharging test was conducted.

The active materials for the cell were used in an amount in terms of an electro-chemical equivalent that the cathode active material was much larger than the anode active material so that the cell capacity is anode controlled. The charging and discharging were conducted at a current density of 0.53 mA/cm$^2$.

Figure 2:
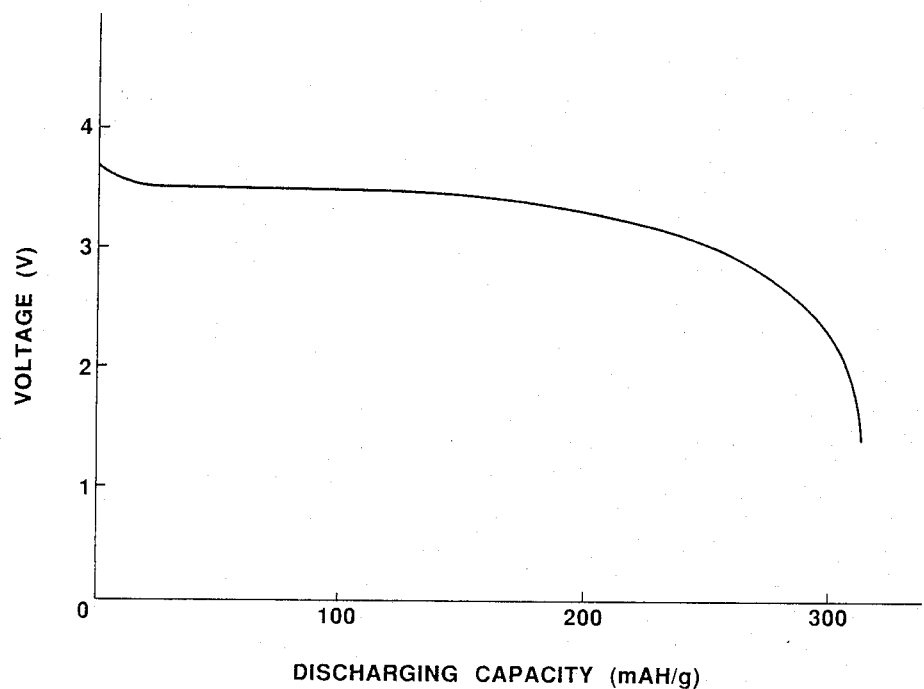
FIG. 2 is a diagram showing the discharge curve of the cell of the illustrative example.

FIGS. 1 and 2 show the results of the charging/discharging cyclic test and the discharge curve. In the cyclic test, charging was performed at 320 mAH/g and discharging was cut at 1.5 V.

It was found that, in the cell of the illustrative embodiment, the use ratio (discharged amount/charged amount x 100) was 97% and is not deteriorated in excess of 60 cycles.

Figure 3:
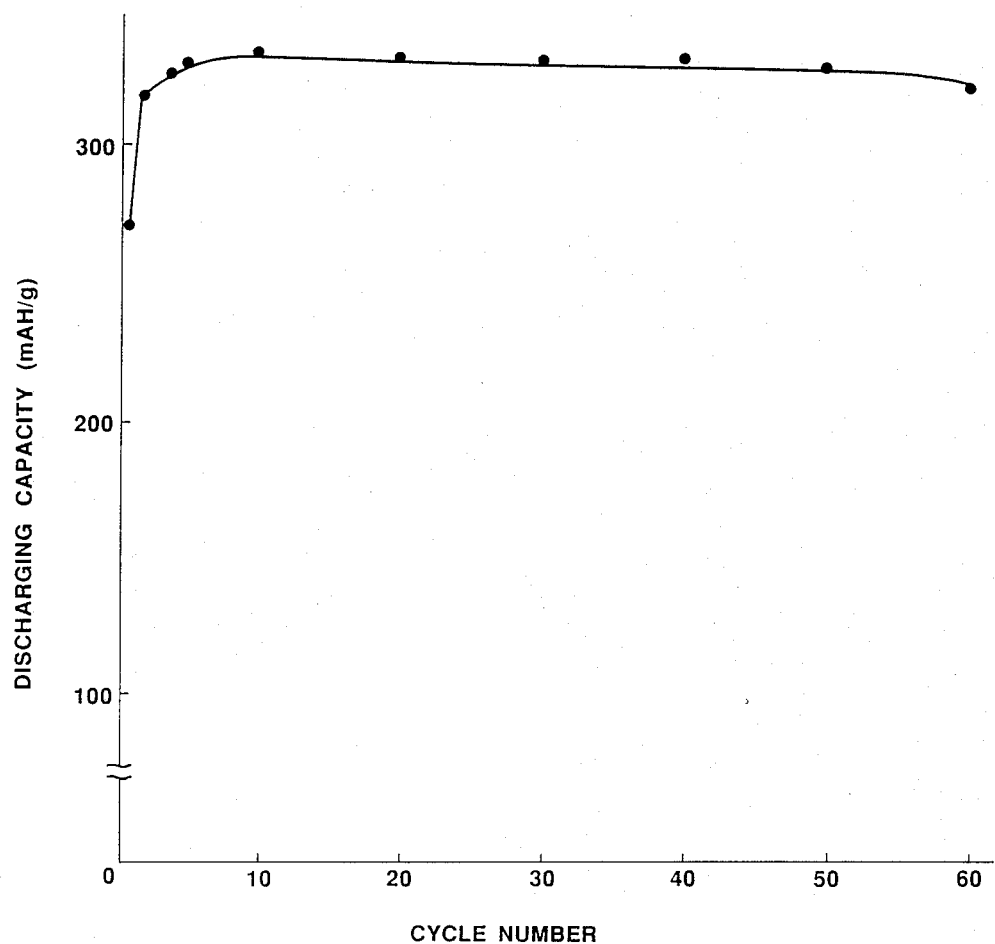
FIG. 3 is a diagram showing the cyclic life characteristics with 350 mAH/g charging.

The cyclic life was checked with the charged amount of 350 mAH/g. The results are shown in FIG. 3.

The use ratio in this case was as high as 95% and, although the capacity was deteriorated slightly beyond 50 cycles but cyclic characteristics was excellent.

COMPARATIVE EXAMPLE 1

For comparison, a cell making use of a petroleum pitch type coke was tested as comparative example.

A cell was prepared by the same method as in the preceding example except using coke having the interlayer spacing $d_{002}$ of the (002) plane of 3.46 A and a true density of 2.03 g/cm$^3$. The coke had an exothermic peak at 745° C. of the differential thermal analysis under air stream.

The cyclic tests were conducted of the produced cell in the same way as in example, except that the discharging was out at the charging amount of 216 mAH/g, 1.5 V in the present example. The results are shown In FIG. 4.

Figure 4:
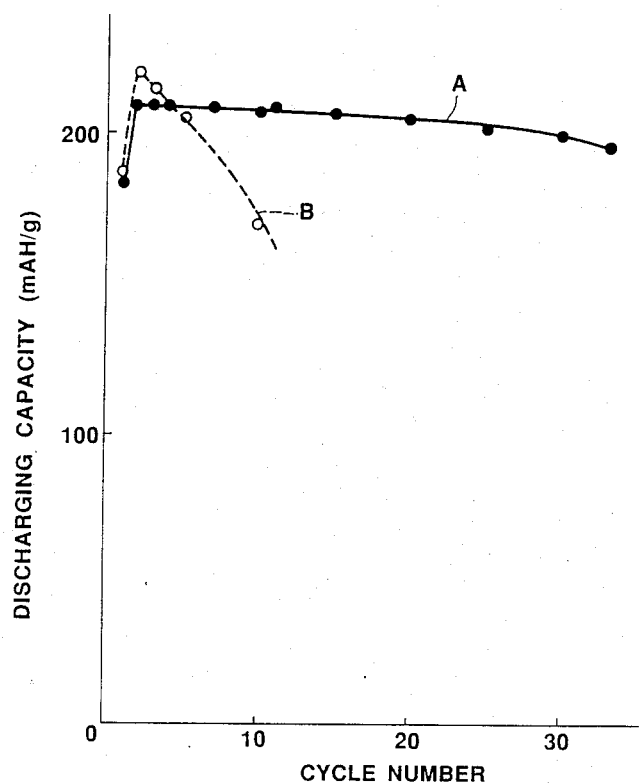
FIG. 4 is a diagram showing cyclic life characteristics of a cell using a petroleum base pitch coke.

Although the cell of the present example had the use ratio as high as 97%, as indicated by a curve A in FIG. 4, the cyclic life was short and the discharge capacity started to be lowered from about 20 cycles on.

When the charge amount was increased to 247 mAH/g, the use ratio was as shown in curve B in FIG. 4, the maximum use ratio being 89% and the cyclic life showed marked deterioration from the second to third cycle on.

COMPARATIVE EXAMPLE Example 2

Carbon was produced in the same way as in example except using the heat-treatment temperature of 1500° C. instead of 1100° C. The parameters of the produced carbon were: interlayer spacing $d_{002}$, 3.69 A: true density, 1.60 g/cm$^3$; and the exothermic peaks at 679° C. and 743° C.

A cell was produced in the same way as in example except using the produced carbon.

A cyclic test similar to that of the example (320 mAH/g charging; 1.5 V discharge cutting) was conducted on this cell. As shown in FIG. 1, deterioration started from 15 cycles on, with the use ratio of approximately 93%.

It is seen from the results of the example and the comparative example that the discharge capacity can be significantly improved with the cell of the present invention, while the cyclic deterioration is markedly lesser than that of the conventional cell.

It is also seen from the comparison between the example and the comparative example that, for the carbon produced by calcining the same material, the discharge capacity was reduced with the decrease in the interlayer spacing of carbon and the cyclic life was deteriorated to a value comparable with that of the prior art example.

It is seen from the above explanation that the parameters of the carbonaceous material used in the anode in the present invention are specified so as to be within the predetermined range, so that there is provided a non aqueous electrolyte solution cell having a larger discharge capacity and a long cyclic life.

Also, the carbonaceous material is used as the anode in the cell of the present invention, the feature is retained that the charging time may be shortened so that the cell having high practical utility may be provided in this regard.

We claim as our invention:

1. A non-aqueous electrolyte cell comprising an
    anode of a carbonaceous material having an interlayer spacing $d_{002}$ of not less than 3.70 A, true density of less than 1.70 g/cm$^3$ and not having exothermic peak at not less than 700° C. as measured by a differential thermal analysis in air stream,
    a cathode containing Li in an amount corresponding to the charging/discharging capacity of not less than 200 mAH per 1 gram of said carbonaceous material; and
    a non-aqueous electrolyte.

2. A non-aqueous electrolyte cell according to claim 1, said cathode contains cathode active material expressed as LiMO$_2$ wherein M stands for at least one of Co and Ni.

3. A non-aqueous electrolyte cell according to claim 1, said carbonaceous material is obtained by carbonizing furan resin.

* * * * *